US008780131B2

(12) United States Patent
Bala et al.

(10) Patent No.: US 8,780,131 B2
(45) Date of Patent: Jul. 15, 2014

(54) SYSTEMS AND METHODS FOR TEXT-BASED PERSONALIZATION OF IMAGES

(75) Inventors: Raja Bala, Webster, NY (US); Reiner Eschbach, Webster, NY (US); Zhigang Fan, Webster, NY (US); Jan P. Allebach, West Lafayette, IN (US); Charles A. Bouman, West Lafayette, IN (US); Hengzhou Ding, West Lafayette, IN (US); Geoffrey J. Woolfe, Umina Beach (AU)

(73) Assignee: Xerox Corporation, Norwalk, CT (US)

( * ) Notice: Subject to any disclaimer, the term of this patent is extended or adjusted under 35 U.S.C. 154(b) by 1370 days.

(21) Appl. No.: 12/340,103

(22) Filed: Dec. 19, 2008

(65) Prior Publication Data

US 2010/0156919 A1 Jun. 24, 2010

(51) Int. Cl.
*G09G 5/00* (2006.01)

(52) U.S. Cl.
USPC .......................................................... 345/582

(58) Field of Classification Search
None
See application file for complete search history.

(56) References Cited

U.S. PATENT DOCUMENTS

| | | | | |
|---|---|---|---|---|
| 5,889,999 A * | 3/1999 | Breternitz et al. | ............ | 717/158 |
| 6,005,972 A * | 12/1999 | Fredlund et al. | ............... | 382/176 |
| 6,037,936 A * | 3/2000 | Ellenby et al. | ................ | 715/764 |
| 6,690,393 B2 * | 2/2004 | Heron et al. | .................. | 715/757 |
| 6,711,291 B1 * | 3/2004 | Stubler et al. | ................. | 382/195 |
| 6,867,787 B1 * | 3/2005 | Shimizu et al. | ............... | 345/629 |
| 6,973,213 B2 * | 12/2005 | Fan et al. | ...................... | 382/176 |
| 7,352,912 B2 * | 4/2008 | Eschbach | ...................... | 382/264 |
| 7,643,024 B2 * | 1/2010 | Bell et al. | ...................... | 345/419 |
| 7,672,509 B2 * | 3/2010 | Yatziv et al. | .................. | 382/167 |
| 2002/0149808 A1 * | 10/2002 | Pilu | ............................. | 358/530 |
| 2004/0102245 A1 * | 5/2004 | Escalera et al. | ................. | 463/32 |
| 2006/0008177 A1 * | 1/2006 | Chermont et al. | ............ | 382/284 |
| 2006/0213386 A1 * | 9/2006 | Funakura | ................... | 101/463.1 |
| 2007/0127043 A1 * | 6/2007 | Maekawa | ....................... | 358/1.9 |
| 2010/0302594 A1 | 12/2010 | Chapman et al. | | |

OTHER PUBLICATIONS

Clark et al., Recognising Text in Real Scenes, 2002, IJDAR, pp. 243-257.*
Slabaugh et al., A Contour-Based Approach to 3D Text Labeling on Triangulated Surfaces, Jun. 27, 2005, 3-D Digital Imaging and Modeling, pp. 416-423.*
Muller et al., Acquisition, Synthesis and Rendering of Bidirectional Texture Functions, 2005, Computer Graphics Forum, No. 1, pp. 83-109.*
Gaspar et al., Interactive Reconstruction from an Omnidirectional Image, Jul. 2001, 9th International Symposium on Intelligent Robotic Systems, pp. 1-9.*

(Continued)

*Primary Examiner* — Aaron M Richer
*Assistant Examiner* — Anh-Tuan V Nguyen
(74) *Attorney, Agent, or Firm* — Fay Sharpe LLP

(57) ABSTRACT

As set forth herein, a computer-implemented method is employed to place personalized text into an image. A location and region within the image is determined where the text is to be placed. The 3D geometry of the surface is estimated proximate to the location where the text is to be placed. A personalized text string is received. The personalized text string is incorporated into the image to appear as if it is rendered onto the surface or object according to the estimated 3D geometry.

12 Claims, 20 Drawing Sheets

(56) References Cited

OTHER PUBLICATIONS

Demonstration at http://www.primelitho.co.uk/direct-smile.htm.
http://www.alphapicture.com/start.php?mod=Image_gallery.
Yufeng Zheng, Bruce C. Hansen, Andrew M. Haun, Edward A. Essock, "Coloring night-vision imagery with statistical properties of natural colors by using image segmentation and histogram matching", *Univ. of Louisville (USA), Color Imaging X: Processing, Hardcopy, and Applications*, San Jose, CA; Jan. 17, 2005; p. 107-117.
M.L. Koudelka, S. Magda, P.N. Belhumeur, D.J. Kriegman, Acquisition, Compression and Synthesis of Bidirectional Texture Functions, http://vision.ucsd.edu/kriegman-grp/papers/texture03.pdf.
Markus Turtinen and Matti Pietikainen, Visual Training and Classification of Textured Scene Images, http://www.macs.hw.ac.uk/~mjc/texture2003/camera-ready/cam-rdy-ab004.pdf.
Automatic photo-merging services: www.dainter.com/photofix/Photofix-Merging.htm, http://www.easy-tools.net.
Manual photo-merging guide: http://www.mts.net/~hajones/tutorial/PhotoMerging2.htm.

* cited by examiner

SYSTEMS AND METHODS FOR TEXT-BASED PERSONALIZATION OF IMAGES

TECHNICAL FIELD

The present exemplary embodiments broadly relate to the insertion of variable text into images. They find particular application with the estimation of image object geometry to provide appropriate text placement therein. However, it is to be appreciated that the present exemplary embodiments are also amenable to other like applications.

BACKGROUND

Today, there is great interest in the personalization and customization of images as a way to add value to documents. This is especially true in transactional and promotional markets, but is gaining traction in more image intensive markets such as photo finishing. Several technologies currently exist to personalize images such as XMPie, DirectSmile, and AlphaPictures, for example.

A fundamental challenge is to estimate the geometry of a surface upon which text is to be rendered. Existing applications commonly resolve the problem by a manual approach, where a 2-dimensional text grid is overlayed on the image and locally warped in X and Y coordinates by the user to appear to fit onto a 3-dimensional object surface. This interface, however, can be cumbersome to manipulate and does not provide a true 3-dimensional surface geometry. Accordingly, text placement is restricted to a fixed location and spatial footprint.

What are needed are convenient and easy-to-use systems and methods to insert personalized text into an image in a natural and less restrictive manner.

BRIEF DESCRIPTION

In one aspect, a computer-implemented method is employed to place personalized text into an image. A location and region within the image is determined where the text is to be placed. The 3D geometry of the surface is estimated proximate to the location where the text is to be placed. A personalized text string is received. The personalized text string is incorporated into the image to appear as if it is rendered onto the surface or object according to the estimated 3D geometry.

In another aspect, a computer implemented method is utilized to replace an existing text string within an image with a personalized text string. A location and a region are identified within the image containing the existing text string to be replaced. Selected features are derived from the existing text string and the 3D geometry of the surface upon which the existing text string has been rendered is determined based on one or more of the selected text features. The existing text string is erased. A personalized text string is received and the personalized text string is incorporated into the image to appear as if it is rendered onto the surface or object in place of the previously existing text string according to the estimated 3D geometry.

In yet another aspect, a method is employed to estimate a 3-dimensional geometry of a planar object within an image. A first convergent line set and a second convergent line set of an image are received. A first vanishing point and a second vanishing point are identified based at least in part upon the convergent line set. A field of view and a normal vector of the image are determined. The field of view and the normal vector are utilized to determine the 3-dimensional geometry of a planar object within the image.

DETAILED DESCRIPTION

Figure 1:
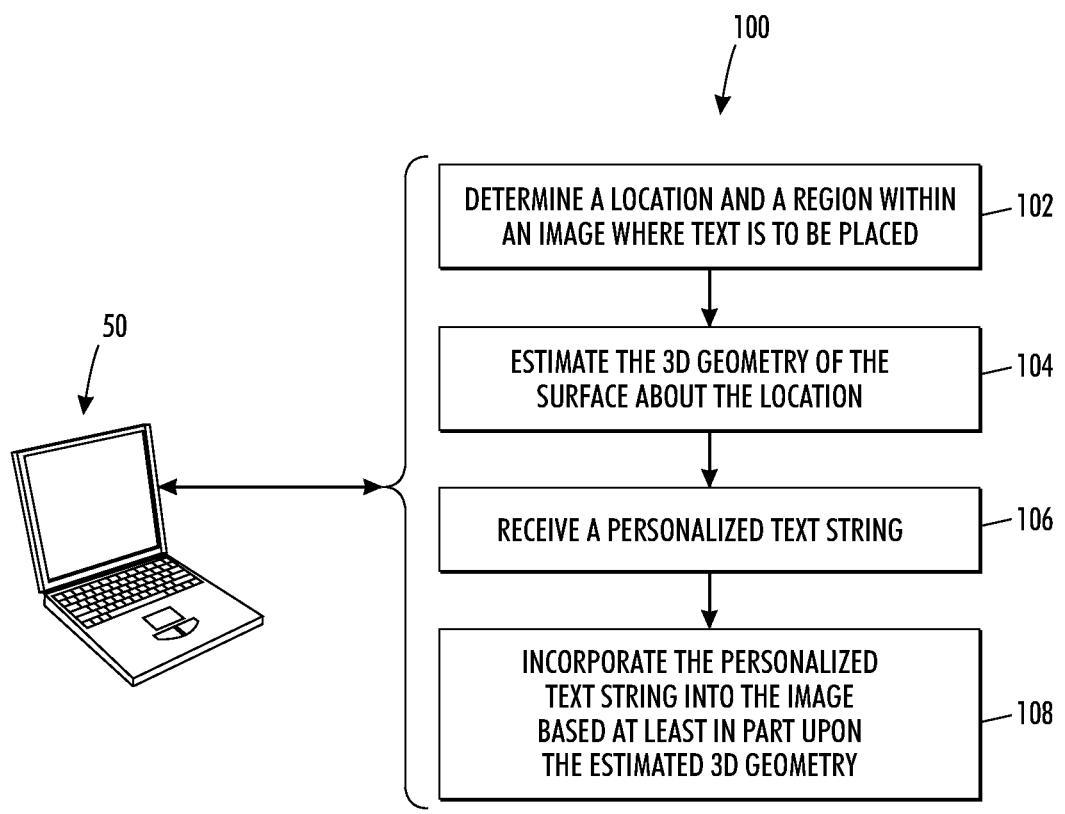
FIG. 1 illustrates a method to render variable text in an image.

The systems and methods described herein can be utilized to incorporate personalized text into arbitrary images, via either a fully automated image analysis and processing approach, or a combination of automatic image analysis and manual/graphical input from a user. The benefit of at least partial automation is that it makes the personalization process easier and faster to execute and can be utilized on substantially any image that includes a planar or quasi-planar surface. Two approaches can employed: 1) insert personalized text into a blank area in an image, or 2) replace existing text in an image with personalized text. Each approach can be facilitated via a bounding polygon field selection or by first estimating a 3-dimensional geometry of the field wherein text is to be inserted. It is possible also to use a conjunction of the two, wherein the bounding polygon is used to estimate the 3-dimensional geometry for text insertion.

A computer 50 can be employed as one possible hardware configuration to support the systems and methods described herein. It is to be appreciated that although a standalone architecture is illustrated, that any suitable computing environment can be employed in accordance with the present embodiments. For example, computing architectures including, but not limited to, stand alone, multiprocessor, distributed, client/server, minicomputer, mainframe, supercomputer, digital and analog can be employed in accordance with the present embodiment.

The computer 50 can include a processing unit (not shown), a system memory (not shown), and a system bus (not shown) that couples various system components including the system memory to the processing unit. The processing unit can be any of various commercially available processors. Dual microprocessors and other multi-processor architectures also can be used as the processing unit.

The computer 50 typically includes at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above can also be included within the scope of computer readable media.

A user may enter commands and information into the computer through a keyboard (not shown), a pointing device (not shown), such as a mouse, voice input, or graphic tablets. The computer 50 can operate in a networked environment using logical and/or physical connections to one or more remote computers, such as a remote computer(s). The logical connections depicted include a local area network (LAN) and a wide area network (WAN). Such networking environments are commonplace in offices, enterprise-wide computer networks, intranets and the Internet.

FIG. 1 illustrates a methodology 100 to incorporate a personalized text string into an image based at least in part upon 3D geometry related thereto. At reference numeral 102, a location and a region are selected within an image where text is to be placed. The location and region can be determined either completely automatically, or via a combination of manual input from the user and automatic analysis of the image. In one embodiment, the user can select an initial location for text insertion, and an algorithm can then grow a region about this initial location. The region growing can be performed based on a defined homogeneity criterion imposed on, for example, pixel color, pixel luminance, or texture. In another embodiment, one or more suitable locations and regions for text insertion are automatically determined by analyzing the image. An exemplary approach for accomplishing this would be to employ a segmentation algorithm that identifies uniform regions according to a defined homogeneity criterion imposed on, for example, pixel color, luminance or texture. At 104, the 3D geometry of the surface about the location is estimated. The 3D geometry estimation can be accomplished based on a first and a second convergent line set within the image. In one embodiment, the first convergent line set is orthogonal to the second convergent line set in 3D space. Such convergent line sets can be obtained via user interaction wherein convergent lines are selected relative to objects within an image, such as a rectangle or other polygon.

In addition, a first vanishing point and a second vanishing point are identified in the image based at least in part upon the convergent lines. The first and second vanishing points can be determined via known 3-dimensional geometric principles. Once the convergent lines and vanishing points are determined, a field of view of the image is determined. The field of view can be determined via a horizontal, vertical or diagonal projection and can be calculated utilizing basic trigonometric principles. Once the field of view is calculated, a normal vector can be determined. In one approach, a cross-product of two orthogonal vectors can be calculated to ascertain the normal vector. Once both the field of view and the normal vector are calculated they can be utilized to determine the 3-dimensional geometry from 104.

At 106, a variable or personalized text string is received. Input of the text can be facilitated via substantially any known data entry means such as a GUI processing component, or retrieval from a database of personalized text record, and can include characters in any language. At 108, the personalized text string is incorporated into the image based at least in part upon the estimated 3D geometry. In one approach, the text is inserted onto a virtual planar surface, whose geometry has been estimated from the image data. One example would be a chalk board, a street sign, a license plate, etc. The variable text is rendered in the location based at least in part upon the 3-dimensional geometry of the location, which can be calculated via the field of view and the normal vector. In this manner, the variable text string can appear as though it was included in the image in its original state. It is understood that a personalized text string might include simple symbols such as stars, smileys, icons, etc., commonly referred to as "wingdings."

Figure 2:
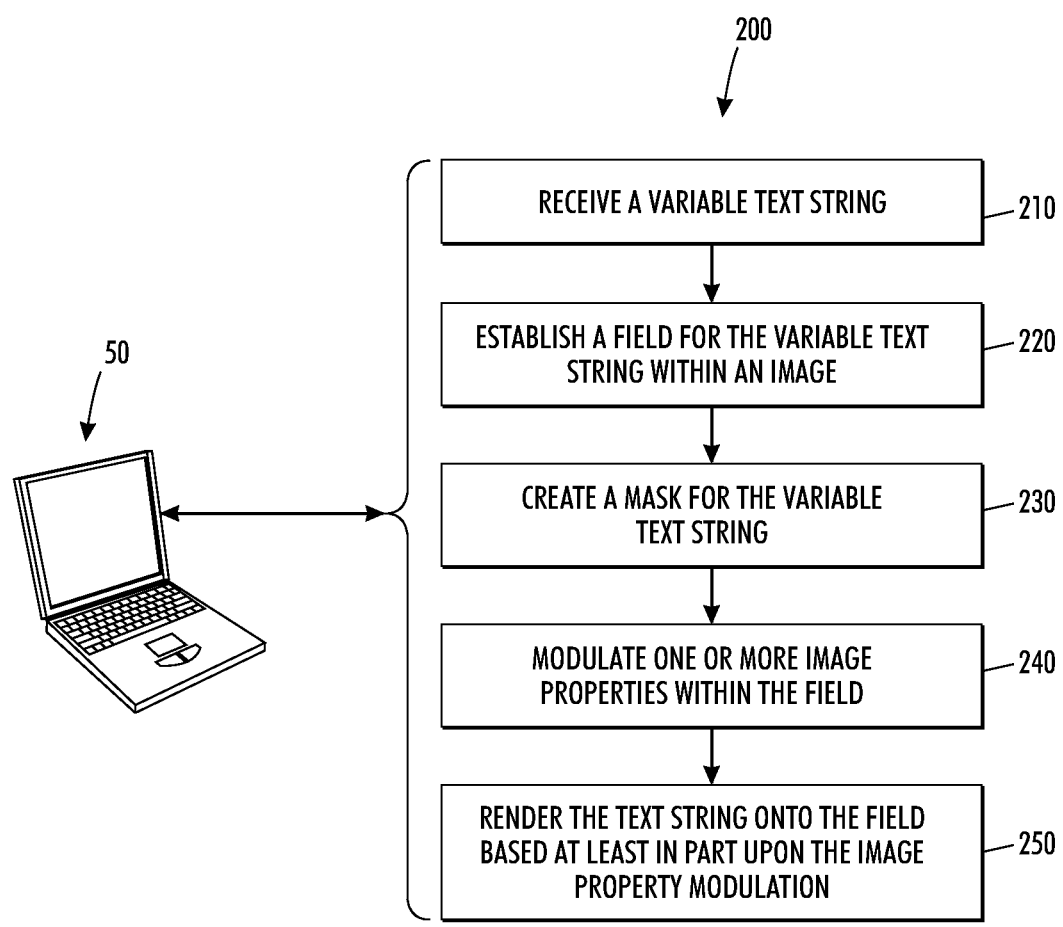
FIG. 2 illustrates a method to render a text string into an image based at least in part upon modulation of one or more properties.

FIG. 2 illustrates a methodology 200 to render a text string onto a field within an image based at least in part upon a property modulation of an image. This is a particular instance of placing text onto a blank field within an image. At 210, a variable text string is received and at 220 a field is selected for insertion of the variable text within the image. Establishing the field can be accomplished via user intervention (e.g., via GUI) to place a polygon that surrounds a desired field within the image. Alternatively, or in addition, an algorithm can be used to identify a region that is homogenous in some property such as color, luminance or texture.

At 230, a mask is created for the variable text string. At 240, one or more image properties within the field are modulated. In a high volume variable image application, this modulation can be executed in real time. The property or properties that are modulated can be dependent on image content and/or the effect that is desired and can include one or more of luminance, chrominance, transparency, texture, and/or pattern modulation. At 250, the text string is rendered onto the field based at least in part upon the image property modulation. In one example, text can be placed into an image to appear as though it was inscribed on a foggy window. Utilizing this methodology can allow an arbitrary image to be utilized wherein several aspects of text insertion are partially automated to provide a quicker process that simplifies state of the art technology.

Figure 3:
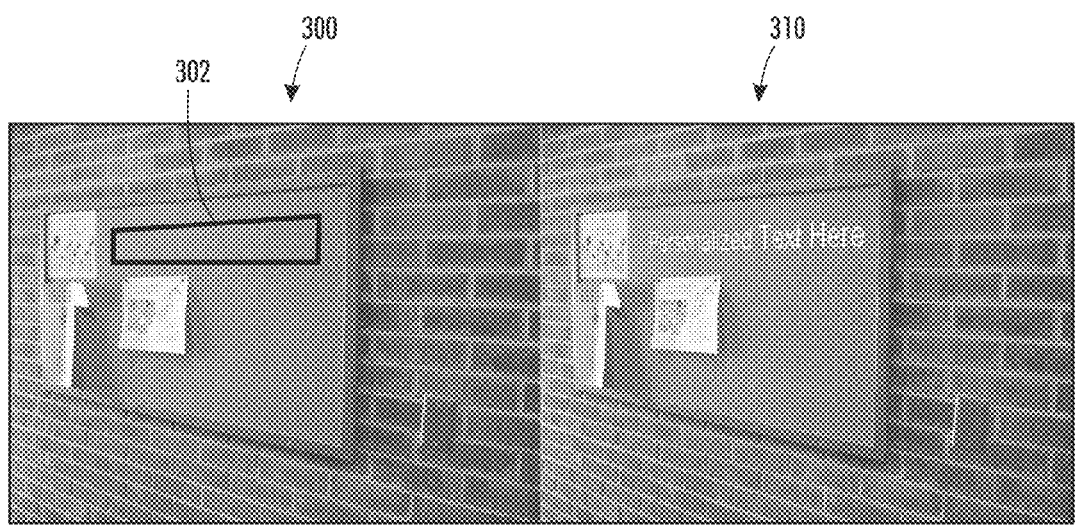
FIG. 3 illustrates insertion of variable text into an image via field selection.

FIG. 3 illustrates a technique for inclusion of variable text within an image 300 utilizing image/pattern modulation. It is a specific example of adding personalized text to a blank field in an image, as set forth in FIG. 2 above. This approach involves identifying a region in the image 300 that contains a certain uniform or homogenous property (e.g. a consistent color as provided within the confines of a bulletin board mounted to a wall) and then modulating some property of the image 300 utilizing the variable text string. One example would be to inscribe personalized text onto a lawn or wall, wherein the luminance or color of the pixels is modulated in the text areas. Conventional methods are limited to a small number of canned images with regions pre-identified for text modulation. As provided herein no such limitations exist utilizing the subject embodiments.

A first step is to establish the location and geometry of text within the image 300. In one embodiment, a user can utilize an input device (e.g., via a GUI with a bounding polygon) to select a region 302 within the image 300, wherein variable text that is placed therein. An algorithm can place the text within the region 302 utilizing a geometric transform that maps a planar rectangle to the region 302. Alternatively, or in addition, an algorithm can be used to identify a region that is homogenous in some property such as color, luminance or texture.

A second step creates a mask for a variable text string, and then modulates a one or more image properties within the region 302. In a high-volume variable image application the latter step is executed in real time. The property or properties that are modulated can be determined based upon image content and the effect that is desired. In one example of inscribing text into sand, one property that is modulated can be texture or shadowing. Simulating the effect of vehicle tracks on grass can further include texture modulation. On the other hand, simulating the effect of dead grass on a green lawn may involve largely chrominance modulation. In the case of inscribing text on a foggy window, the property being modulated can be transparency, which may translate to image brightness and/or contrast. Standard image rendering techniques (e.g. those found within Photoshop or other software), can be utilized to accomplish many of these effects.

Figure 4:
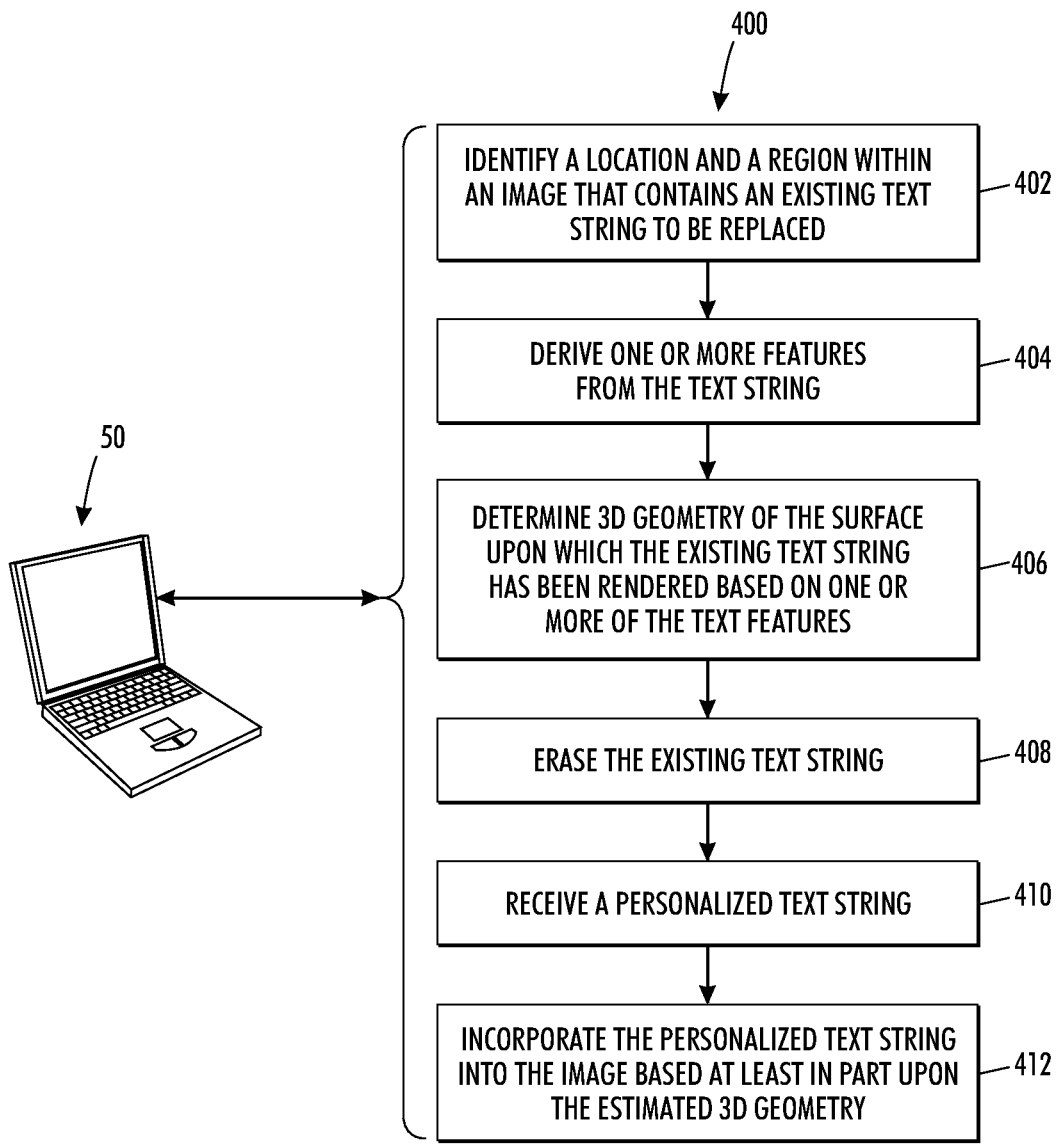
FIG. 4 illustrates a method to insert variable text into an image to replace existing text therein.

FIG. 4 illustrates a methodology 400 that is utilized to insert variable text into an image to replace existing text therein. At reference numeral 402, a location and a region is identified within an image that contains an existing text string to be replaced. In one embodiment, the region is located within a planar surface of an object within the image and further contains text thereon. Furthermore, in this embodiment, the location and region are identified by the user by specifying a bounding polygon, such as a quadrilateral, around the existing text via a graphical user interface. In another embodiment, a text identification algorithm is used to automatically identify the location and region of existing text in the image. An example would be Xerox PageCam technology (www.pagecam.com). At 404, one or more features are derived from the text string. In one example, the feature is a pair of orthogonal vanishing points within a predetermined space.

At 406, the 3D geometry of the surface upon which the existing text string has been rendered is determined based on one or more of the text features. At 408, the existing text string is erased. In one embodiment, the text is erased by first segmenting the region as a background or a text string. The segmentation can be used to erase existing text and further to extract horizontal and vertical strokes and lines from the text within the region. In one approach, the segmentation is performed via a model based classification that utilizes a multi-variant Gaussian model on a background. The likelihood of each pixel within the region can be computed and applied to a first predetermined threshold to classify it either as background or part of a text string. If the likelihood is greater than the predetermined threshold, the pixel can be classified as background. Alternatively, if the likelihood is less than or equal to the threshold, the pixel can be classified as text.

A second threshold can be selected to erase the text from the region. The second threshold can be greater than the first threshold and can be employed to include more area as text. In this manner, minimal artifacts remain in the region after erasing such as isolated text pixels. For stroke and line extraction, a segmentation that produces an accurate edge map can be employed to separate characters contained within the region. In one example, a threshold can be adaptively determined to maximize the number of connected components in the segmentation result. A binary search algorithm can be employed to narrow in on the threshold that produces the largest number of connected components.

At 410, a personalized text string is received. At 412, the personalized text string is incorporated into the image based at least in part upon the estimated 3D geometry. In one embodiment, a field of view and a surface normal vector can be discerned from properties of the existing text string that is the string to be replaced in the image. First, a horizontal convergent line set is identified based at least in part on the text string. In one approach, a Hough transform can be utilized to focus on extracted straight lines from the segmentation. The Hough transform can be used to transform each pixel $(x_0, y_0)$ in the original image into a straight line $b=-x_0a+y_0$ in a Hough space. By applying the Hough transform in a horizontal direction, peaks are identified within the Hough space that are representative of horizontal convergent lines in the image.

Once the peaks are converted back from the Hough space to the image, they can correspond to a horizontal convergent line set (e.g., a baseline, a waistline, a capline and/or a beard line of text) within the region. Second, a vertical convergent line set is identified that is based at least on part on the text string. In this instance, a series of characters based on local Hough transforms can be employed instead of applying a single global transform as is done in the horizontal case. The vertical convergent line set can be obtained by transform to the Hough space to determine points that exist close to a vertical line and back to the image space for presentation thereon. A least squares fitting can be performed in the Hough space to compute a first and a second vanishing point associated with the horizontal and vertical convergent line sets.

Once the first and the second vanishing points are computed, the field view of a virtual camera and a surface normal can be determined based at least in part upon the first and second vanishing points within the region. In this manner, the variable text is inserted within the region, at 412, based at least in part upon the field of view and the surface normal vector.

Figure 5:
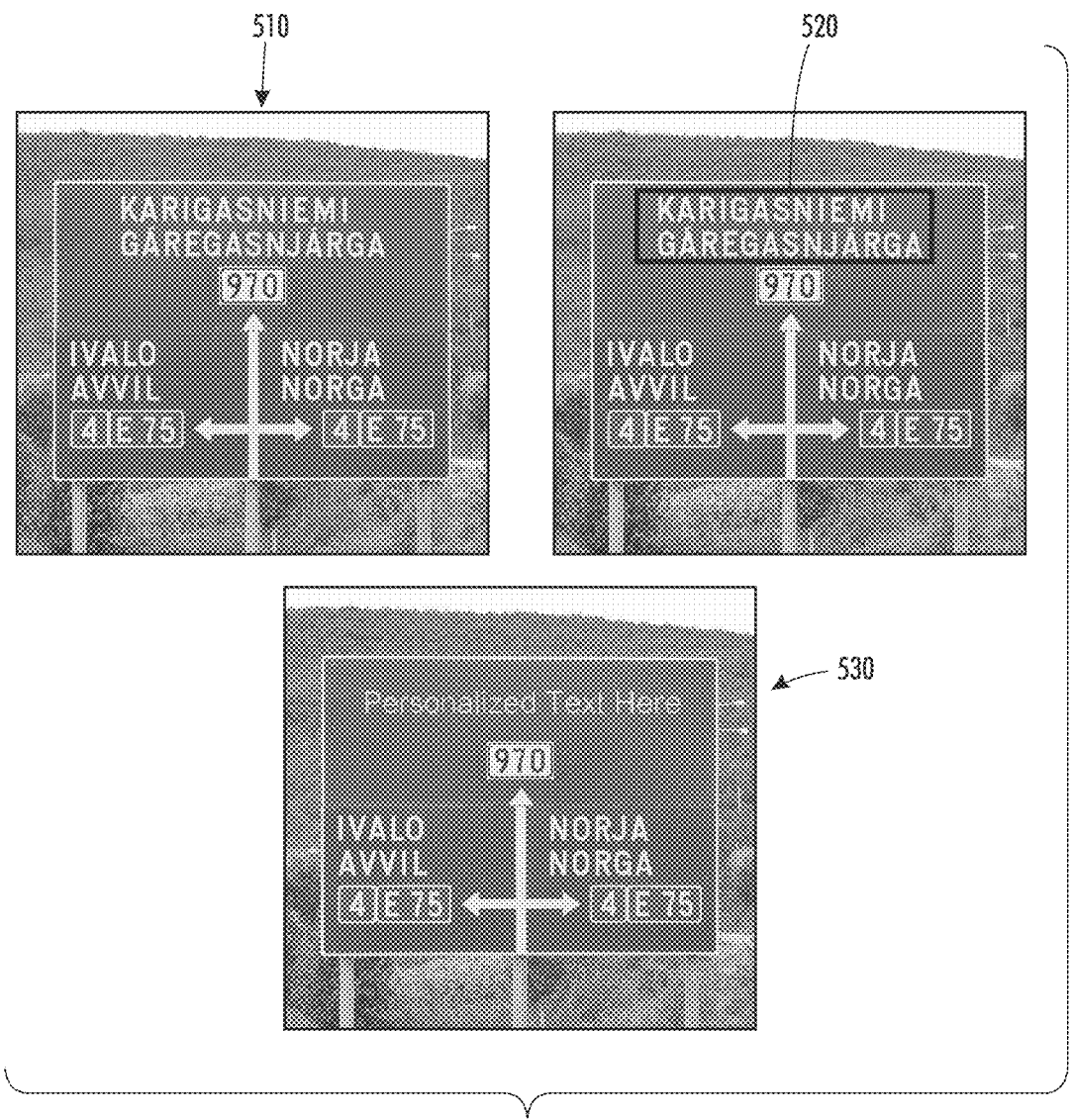
FIG. 5 illustrates insertion of variable text into a planar field of an image.

FIG. 5 illustrates the text replacement/insertion technique that was specified in FIG. 2. An image 510 of a street sign contains a plurality of text strings located in various locations throughout the area of the sign. Second, an object 520 is selected from the image 510 that can serve as a natural container for text. Once selected, a segmentation algorithm can separate the text from the background. The existing text can be erased by interpolating nearby background colors, or other known backfill methods. Next, as shown in image 530, new (personalized) text is placed into the object 520. Ideally, the new text is consistent with the original text in terms of color, geometry, shading, and font approximation. For color, an average of the pixels of the original text can be selected. Other more carefully selected statistics of the original text color within the object 520 can be used, such as a histogram peak, a trimmed mean or a percentile.

A cue for the geometry can be obtained from the edges of the object 520, which can be a user-specified bounding area. This provides a geometric transformation between a planar rectangle and the object 520, which can then be applied to the personalized text string. It is to be appreciated that this method can be utilized to replace text in substantially any image object such as a street sign, a store sign or a license plate. Moreover, the current invention is advantageous over existing solutions in that existing solutions often support a small number of preselected images with predetermined text containers, while the current invention allows the user to specify any arbitrary image. Accordingly, once the object 520 is specified around a desired text field, the text replacement is accomplished automatically.

Figure 6:
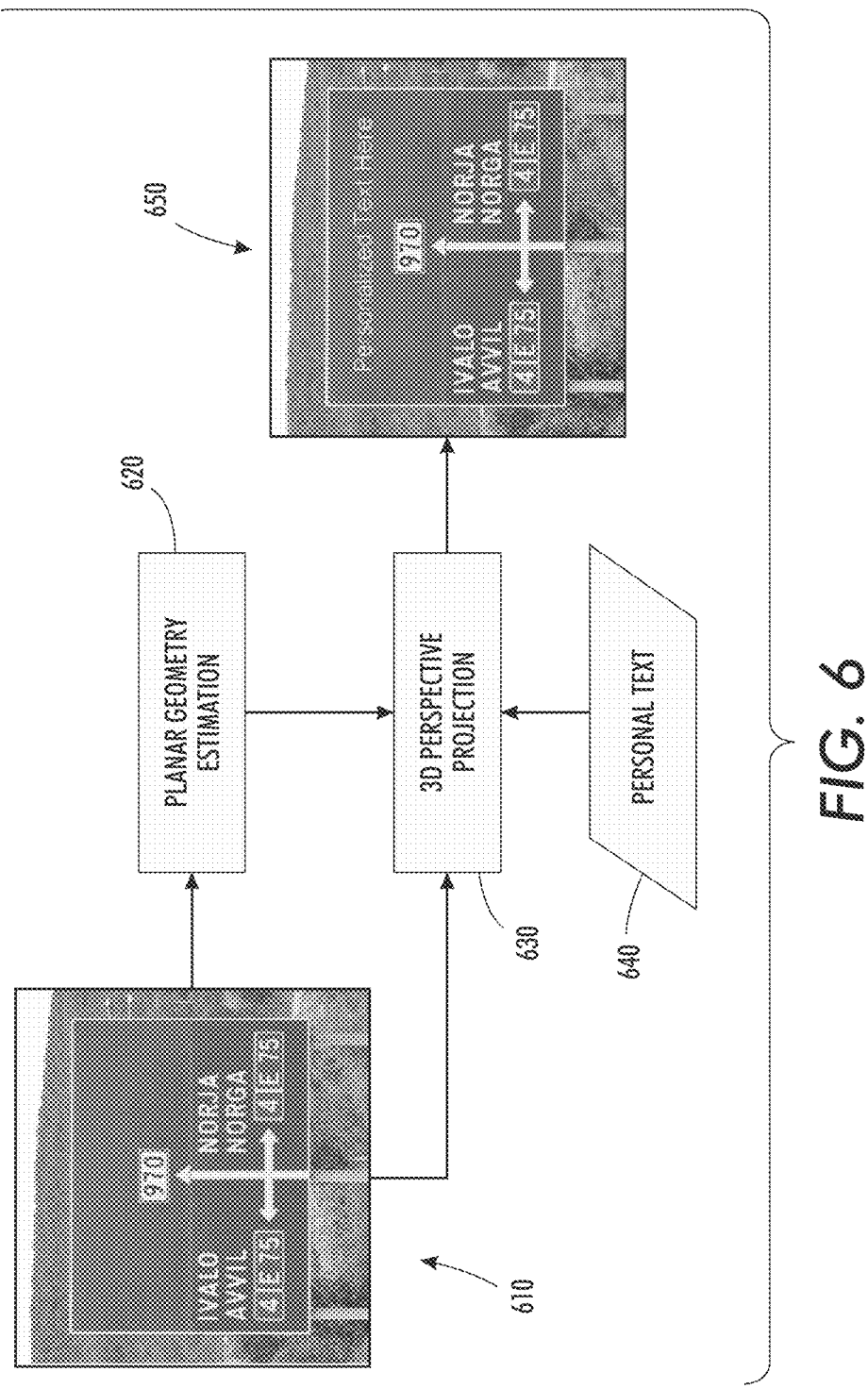
FIG. 6 illustrates the insertion of variable text into the planar field of an image utilizing 3-dimensional perspective projection.

Incorporating personalized text into the image 510 using the method specified in FIG. 3 is illustrated in FIG. 6. In this approach, the variable/personalized text string replaces an existing text string in the image. In this example, the existing text is shown on a planar surface in an image 610. By estimating an accurate underlying 3-dimensional planar geometry, the personalized text can be rendered according to this 3-D geometry, and can furthermore be moved around in the image while still appearing to belong to the planar surface. The rendering of text can be accomplished by reconstructing a virtual 3-dimensional camera and simulating the projection of the original planar surface onto the camera plane.

Once the planar geometry estimation is complete at 620, a 3-dimensional perspective projection can be reconstructed at 630 to simulate the projection of the 3D scene onto the camera plane. The output of the geometry estimation 620 is input to construct the 3-dimensional projection 630. The 3-dimensional perspective projection 630 requires two parameters, a field of view and a normal vector. While field of view specifies the camera setup, the normal vector determines the 3-dimensional orientation of the text. At 640, a personalized/variable text string is input into the 3-dimensional perspective projection 630. In this manner, the variable text entered at 640 into the original image is projected to produce the natural text-rendered image 650.

Figure 7:
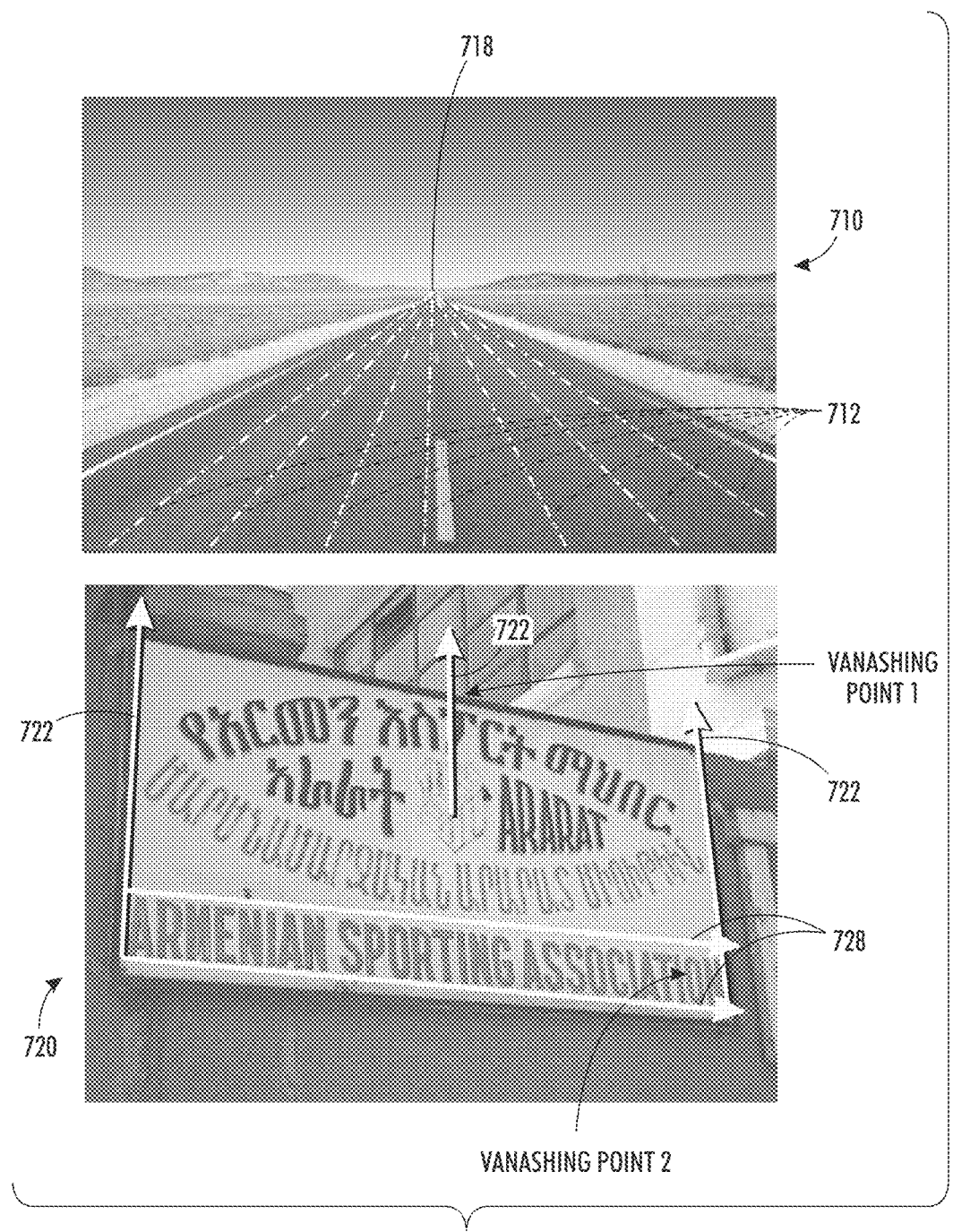
FIG. 7 illustrates the convergent line sets within an image.

FIG. 7 illustrates computing vanishing points in an image for estimating a field of view and a normal vector. An image 710 includes a plurality of parallel lines 712 in the original 3D scene that converge at a vanishing point 718 within the image. As known, the convergent lines 712 are parallel in a 3-dimensional scene shown in the image 710. An image 720 shows a first vanishing point 722 and a second vanishing point 728. In planar geometry, if two orthogonal vanishing points can be identified a complete planar description can be obtained. In other words, field of view and the normal vector can be computed from the two vanishing points. As illustrated in the image 720 the vanishing point 722 is orthogonal to the vanishing point 728.

Figure 8:
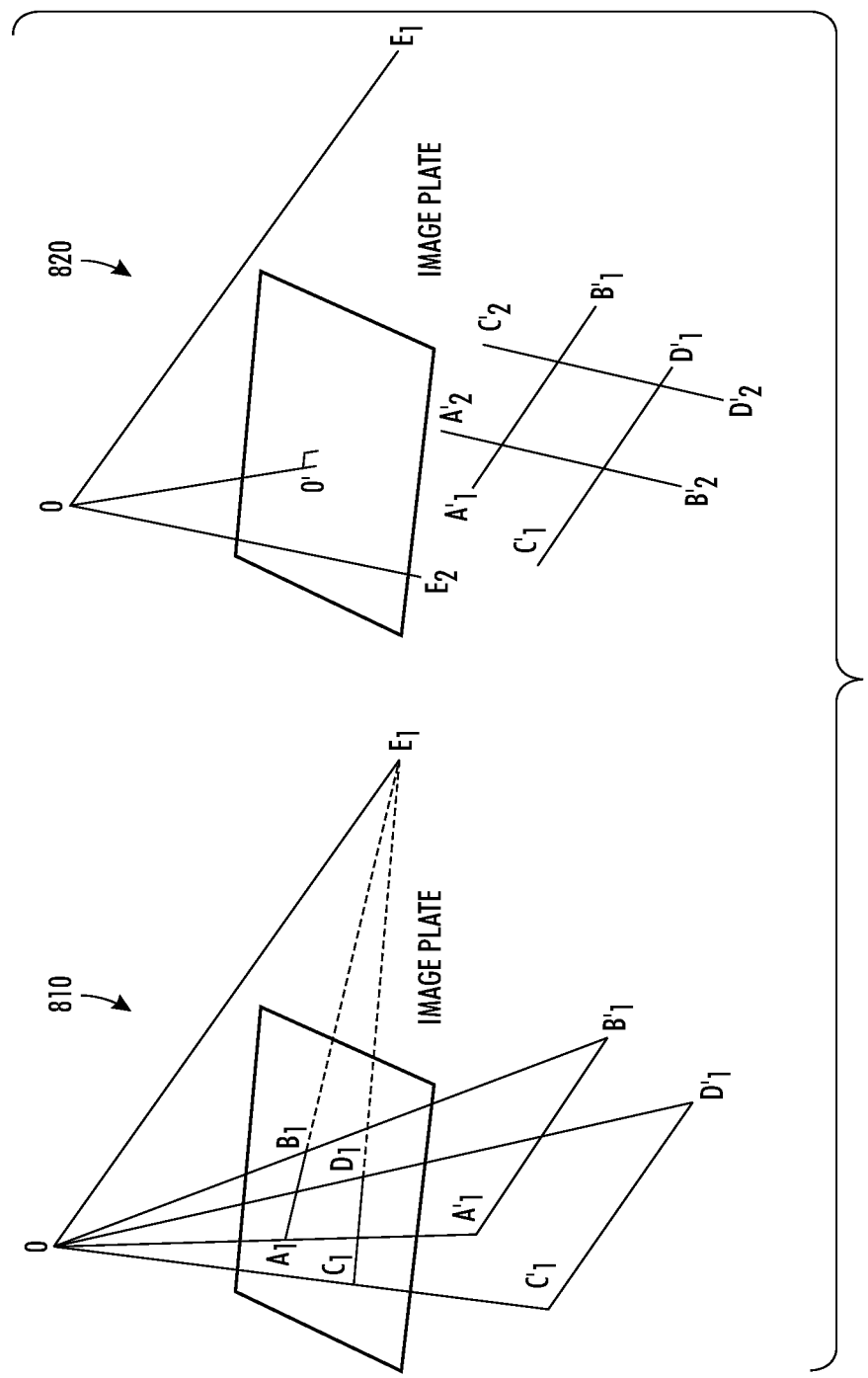
FIG. 8 illustrates geometric renderings that illustrate properties of orthogonal lines.

FIG. 8 illustrates geometric renderings 810 and 820. The geometric rendering 810 has a single vanishing point and the geometric rendering 820 has two vanishing points. In the rendering 810, 0 designates a projection center, which can be equivalent to a camera center. $A_1B_1$ and $C_1D_1$ are projected lines in the rendering 810 and are parallel in the 3-dimensional world. $E_1$ is the intersection of $A_1B_1$ and $C_1D_1$ (e.g. the vanishing point O). Connecting $OE_1$ we find that $A_1B_1$ belongs to plane $OA_1'B_1'E_1$, and that $C_1D_1$ belongs to a plane $OC_1'D_1'E_1$. It follows that $A_1'B_1'$ is parallel to $C_1'D_1'$ which is parallel to $OE_1$.

The geometric rendering 820 includes two vanishing points. Similar to the rendering 810, $A_2'B_2'$ is parallel to $C_2'D_2'$ is parallel to $OE_2$. Since there is an assumption that two pairs of parallel lines are orthogonal, i.e. $A_1'B_1'$ is perpendicular to $A_2'B_2'$ and that $C_1'D_1'$ is perpendicular to $C_2'D_2'$, $OE_1$ (and $OE_2$) should be orthogonal with each other. Therefore, $OE_1$ is perpendicular to $OE_2$ (e.g., the angle of $E_1OE_2$ is equal to 90°. From this angle we can begin to compute the field of view.

Figure 9:
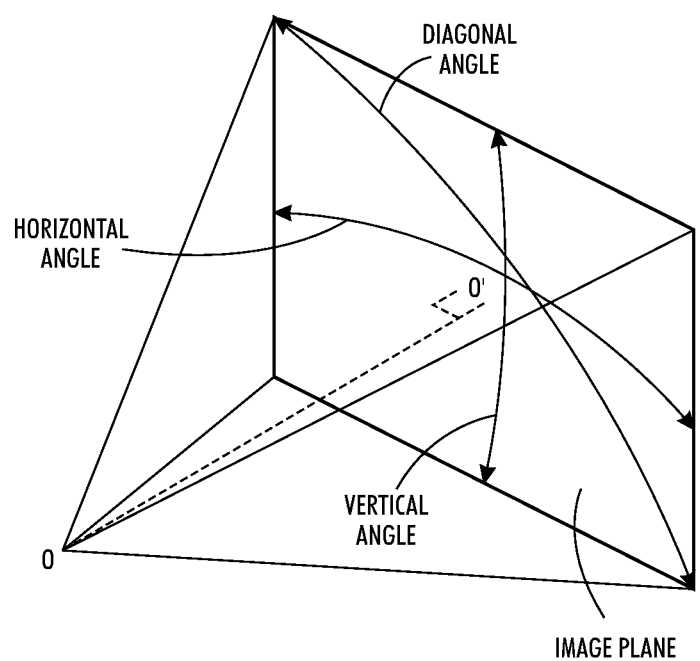
FIG. 9 illustrates a field of view calculation for an image.

FIG. 9 illustrates a field of view definition. O is a projection center and O' is the center of the image. Accordingly, OO' should be orthogonal to the image plane. There are three ways to define a field of view of a particular camera projection which include the angle subtended horizontally, vertically and diagonally, as illustrated in the three arcs with two-ended arrows in FIG. 9. The horizontal definition is utilized with the embodiments herein. Since the dimension of the image is known (in pixels), computation of the length of OO' can provide the field of view.

Figure 10:
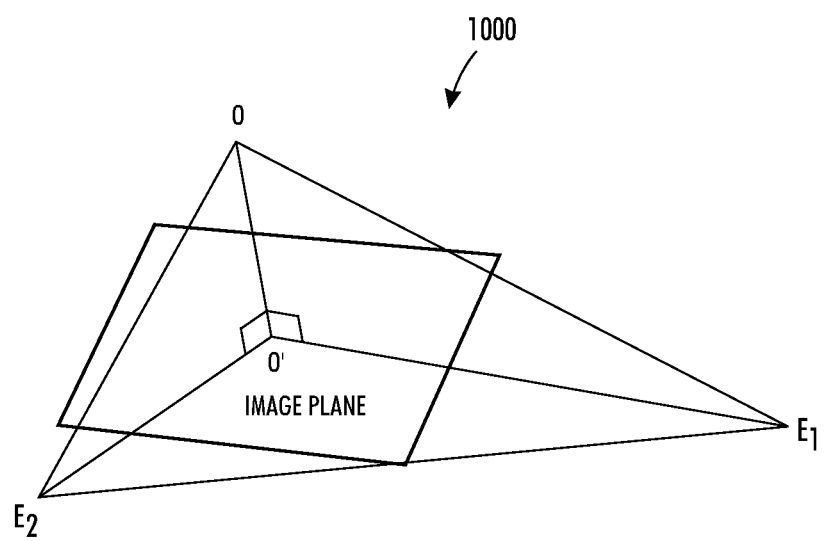
FIG. 10 illustrates a field of view calculation and a normal vector calculation for an image.

FIG. 10 illustrates a geometric rendering 1000 to calculate OO'. As indicated, there are three right angles within the rendering 1000. The angle $E_1OE_2$ is equal to the angle of OO'$E_1$ equals OO'$E_2$ which is equal to 90°. This is ascertained based on knowledge that the angle $E_1OE_2$ is equal to 90°. Utilizing the Pythagorean Theorem, it can be concluded that:

$$OO' = \sqrt{\frac{1}{2}(E_1E_2^2 - O'E_1^2 - O'E_2^2)} \quad (1)$$

Further we can compute a field of view as $$\theta_{fov} = 2\arctan\left(\frac{w}{2OO'}\right) \quad (2)$$

wherein w is the width of the image. Again since $A_1'B_1'//C_1'D_1'//OE_1$ and $A_2'B_2'//C_2'D_2'//OE_2$, the normal vector which is orthogonal to $A_1'B_1'$, $C_1'D_1'$, $A_2'B_2'$ and $C_2'D_2'$ must also be orthogonal to $OE_1$ and $OE_2$. The normal vector can then be computed as a cross product of the $OE_1$ and $OE_2$.

$$\vec{v}_{norm} = \vec{OE_1} \times \vec{OE_2} \quad (3)$$

Once both field of view and the normal vector are calculated, they determine the 3-dimensional projection, which can be utilized to render new text in the image.

Figure 11:
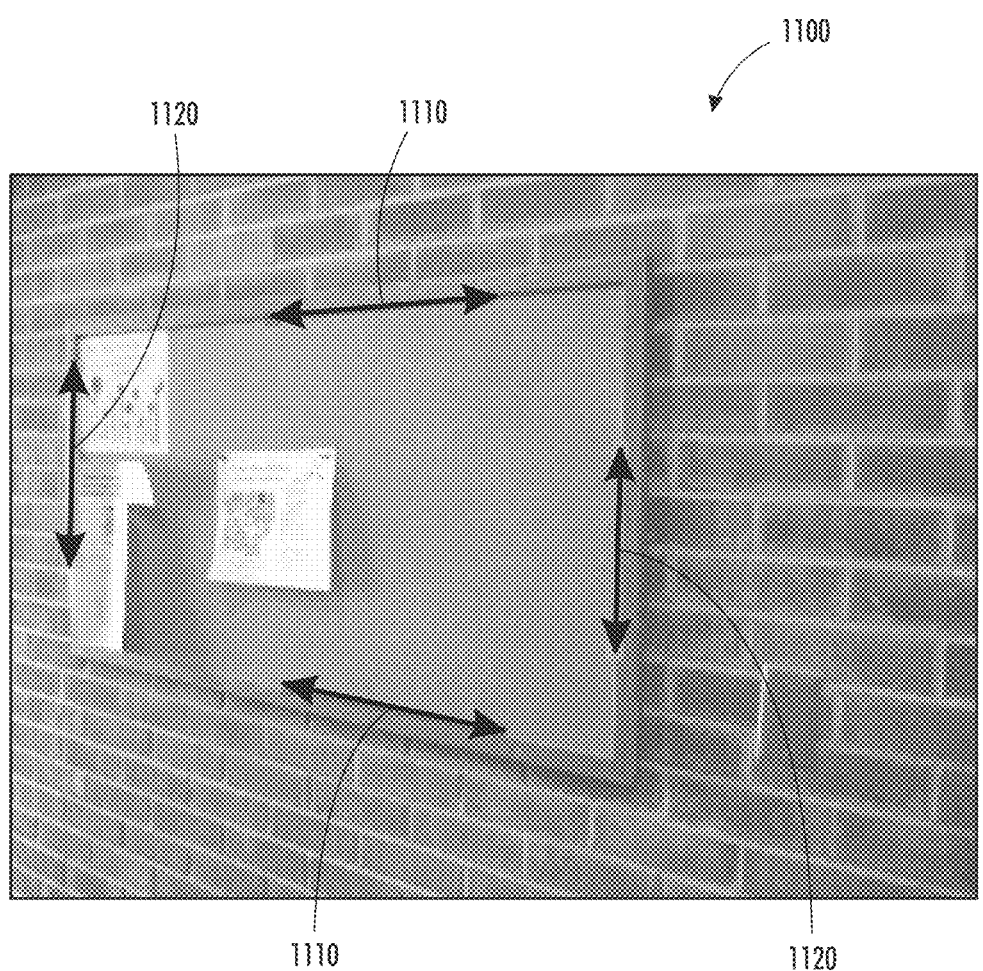
FIG. 11 illustrates user selection of convergent line sets within an image.
Figure 12:
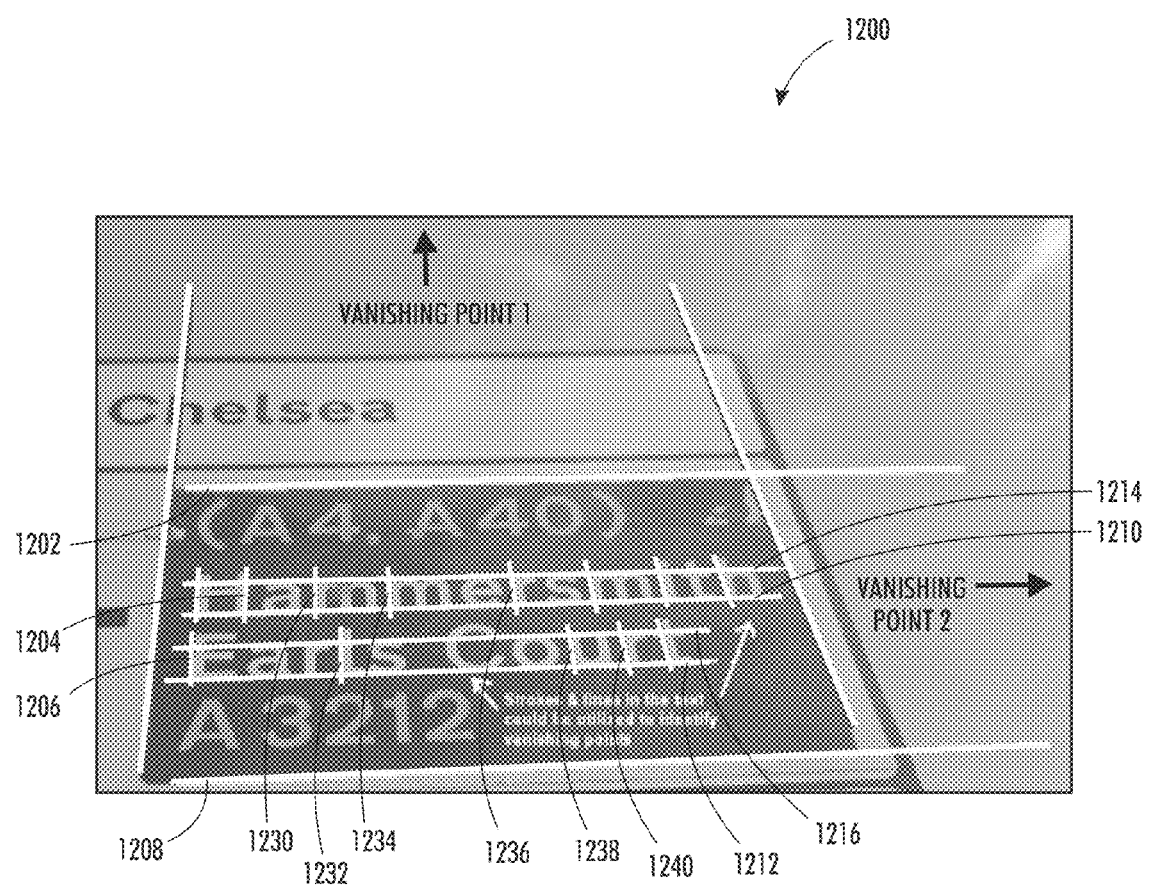
FIG. 12 illustrates convergent line sets automatically selected via an algorithm.

FIGS. 11 and 12 illustrate two disparate methods for determining vanishing points within an image. As set forth herein, determining vanishing points is equivalent to extracting convergent line sets from an image. In particular, FIG. 11 represents an interactive approach wherein a user can visually identify sets of convergent lines within an image. In contrast, FIG. 12 illustrates identifying convergent line sets in the image based on existing text therein.

Turning first to FIG. 11, a user can visually identify sets of convergent lines in the image 1100 which represents a bulletin board attached to a brick wall. As the bulletin board is a rectangular shape, a user can ascertain that the line pair 1110 is parallel in the original scene, and converges at a horizontal vanishing point within the image. Likewise the user can ascertain that the line pair 1120 converges at a vertical vanishing point. Generally, this task is dependent upon the objects present within an image. Experiments show that for a given image, the aforementioned visual interactive approach yields fairly robust and consistent results across a variety of users.

FIG. 12 is an image 1200 of a street sign. The street sign contains four text strings 1202, 1204, 1206 and 1208. Each of the text strings 1202-1208 is written on a separate horizontal baseline. The baseline is the location of the bottom of each of the letters within each text string. For example, the baseline 1210 for the text string 1204 runs under the bottom of each of the letters HAMMERSMITH. Similarly, the baseline 1212 of the text string 1206 runs under the letters EARLS COURT. The waistlines 1214 and 1216 represent an imaginary horizontal rule that indicates the top of the body height of lower case letters within the string. The baselines 1210, 1212 and the waistlines 1214, 1216 can be utilized to provide one set of convergent horizontal lines.

The vertical text strokes 1230, 1232, 1234, 1236, 1238 and 1240 are representative of substantially any vertical line stroke that is associated with text within a field in which variable text will be inserted. The vertical text strokes 1230-1240 can represent a second convergent line set which is vertical. Accordingly, the horizontal convergent line set and the vertical convergent line set are representative of a first vanishing point and a second vanishing point respectively. It is to be appreciated that an algorithm can be utilized for this purpose to automatically identify convergent line sets by analyzing the image.

Figure 13:
FIG. 13 illustrates identification of a region within an image.
Figure 14:
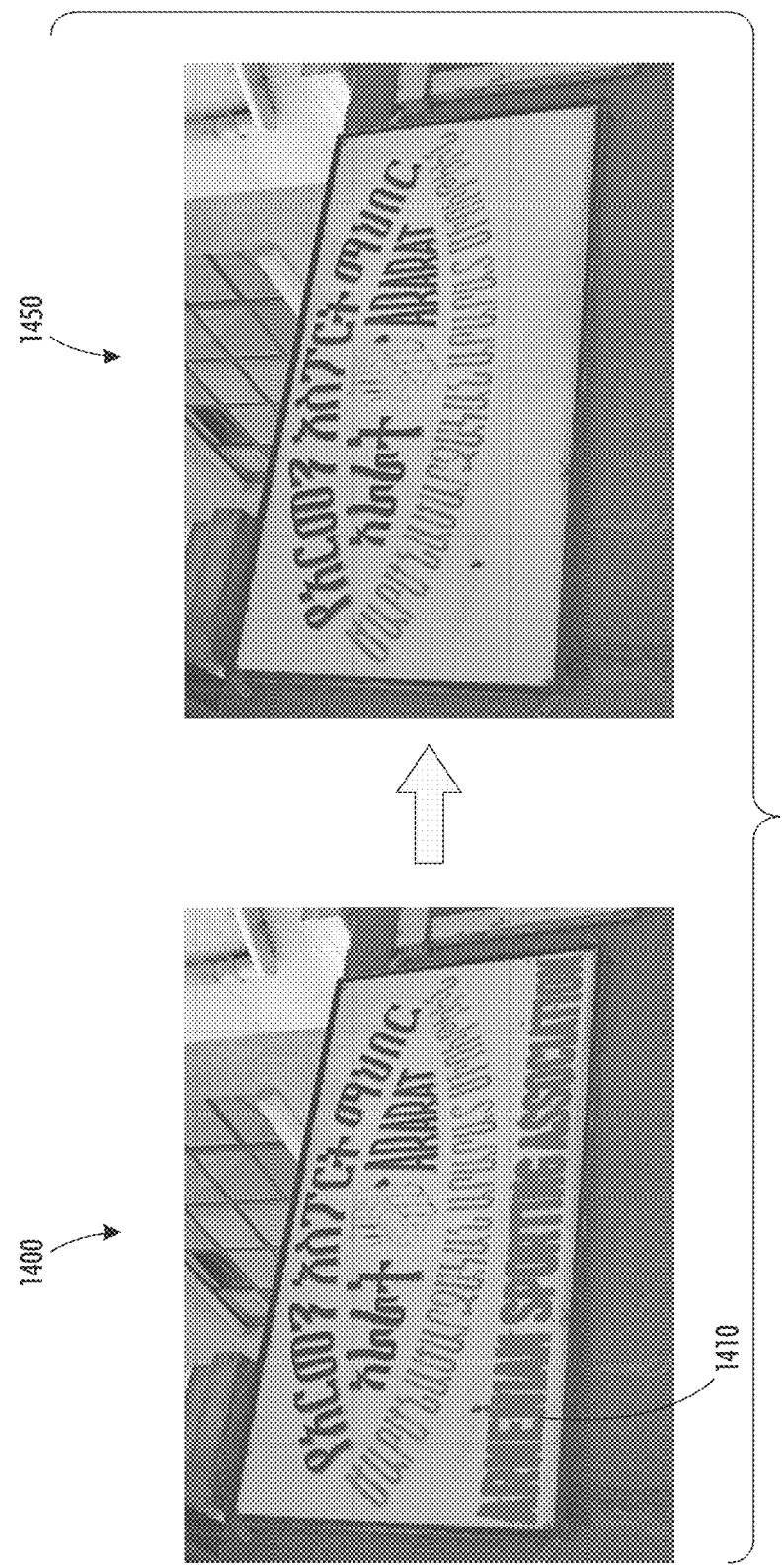
FIG. 14 illustrates placement of a mask to erase text within an image.
Figure 15:
FIG. 15 illustrates an edge map identified via segmentation.

In general, it is difficult if not impossible to reliably extract such line sets from arbitrary images in a fully automatic fashion, since the notion of parallelism in the original 3-dimensional scene does not translate in a straightforward and unique manner to the 2-dimensional image representation. However, the possibility exists if we restrict ourselves to images from a constrained domain. A particular class of images that can be utilized is those already containing text within the scene (e.g., a license plate, a street sign, a billboard, etc.) In this manner, the original text in all or part of the scene can be replaced with personalized or variable text. The preferred embodiment relies upon the presence of standard alphanumeric characters found in English and some other languages that exhibit a sufficient number of horizontal and vertical strokes. As presented above, the horizontal character strokes of the original text, along with the baseline and waistline of the text strings provide one set of convergent lines, while the vertical character strokes, form the other set of convergent lines. They are mutually orthogonal. FIGS. 13, 14 and 15 illustrate how to identify character strokes and lines within an image.

Turning first to FIG. 13 which illustrates an image 1300 that contains a sign with a plurality of text strings. The sign includes a region 1310 wherein variable text can be placed. This region can be identified automatically via one or more known techniques (e.g., Xerox Page-Cam, www.pagecam.com) or via a user interaction wherein a user draws few lines to identify a region where text is to be replaced.

Once a region is selected, segmentation is implemented to separate a background 1320 from a text string 1330. There are two objectives for this segmentation. First, existing text can be erased and text pixels can be replaced with a local estimate of the background. Second, the segmentation extracts horizontal and vertical strokes and lines (e.g. to identify vanishing points associated with each as set forth above). In one embodiment, the segmentation is a model based classification, where a multivariate Gaussian model with mean vector $\mu$ and covariance matrix $\Sigma$ is used to characterize the background area. A likelihood of each pixel is computed and applied to a threshold T to classify. If the likelihood L(x)>T, then that pixel can be classified as a background pixel. If the likelihood L(x) is less than or equal to the threshold T, it is classified as text. An equation to determine the value of L(x) is set forth below.

$$L(x) = \frac{1}{(2\pi)^{\frac{3}{2}} \sqrt{\det(\Sigma)}} \exp\left\{-\frac{1}{2}(x-\mu)^T \sum\nolimits^{-1}(x-\mu)\right\} \quad (4)$$

To choose threshold T, the two objectives of erasing text and extracting horizontal and vertical strokes and lines are treated differently. For erasing test, a higher fixed threshold is selected to include more area as text, so that after erasing minimal artifacts are left.

FIG. 14 illustrates an image 1400 wherein a mask 1410 is placed upon a text string within a region (e.g. as set forth in FIG. 13 above). The mask 1420 represents an area to be erased from the image. An image 1450 represents the image 1400 wherein text has been erased which is under the mask 1410. In general, for extraction of strokes and lines a segmentation that produces a more accurate edge gap is preferred to separate the characters. To this end, the threshold is adaptively determined to maximize the number of connected components in a segmentation result. Specifically, a binary search algorithm can be applied to narrow in on a threshold that produces the largest number of connected components, as set forth in the image 1500 of FIG. 15. An edge map 1510 is identified from applying such a threshold.

As shown in the image 1500, all text strings within the sign except text string 1520 are written on a curved or non-linear baseline. Accordingly, the text string 1520 is desirable for edge detection since an appropriate convergent line set can be ascertained in both the horizontal and vertical direction. In this manner, the vanishing points associated with each convergent line set can be identified and a field of view and normal vector can be calculated for variable text placement.

Figure 16:
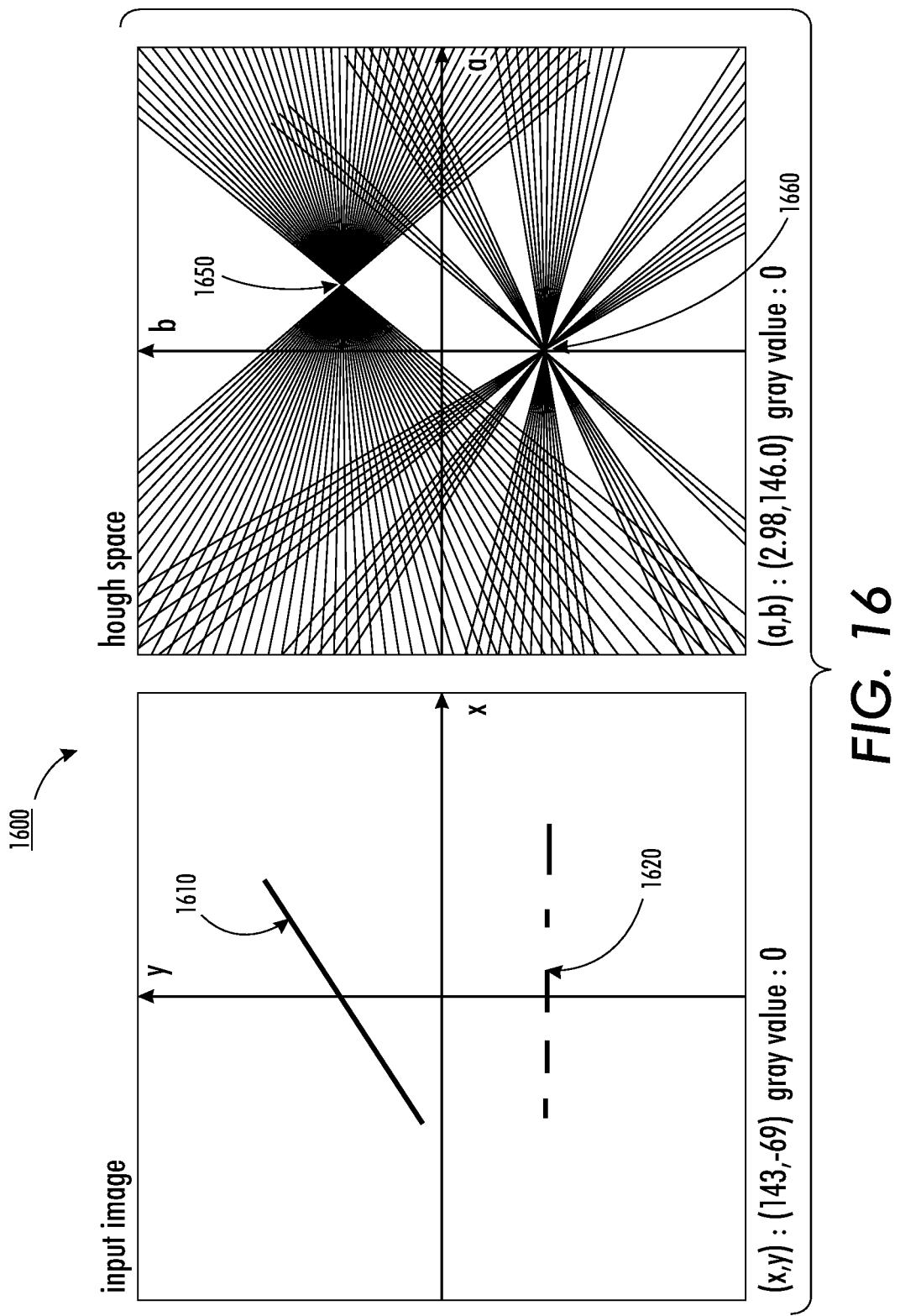
FIG. 16 illustrates conversion of lines in an image to points in a Hough space.

Convergent line sets can be identified to find straight lines or parametric curves within an image. For purposes of this embodiment, however, the focus is on the extraction of straight lines. As known, a Hough transform transforms each pixel $(x_0, y_0)$ in an original image into a straight line represented as $b=-x_0 a+y_0$ in a Hough space which can be considered a parameter space. If a set of points lie on the same line, a set of lines intersecting at the same point is expected, giving a peak at that point. For example FIG. 16 illustrates a solid line 1610 and a dashed line 1620. In the Hough space, the lines 1610 and 1620 correspond to a bright point 1650 and 1660 respectively. The points represent two peaks in a 3-dimensional rendering, such as a histogram.

Figure 17:
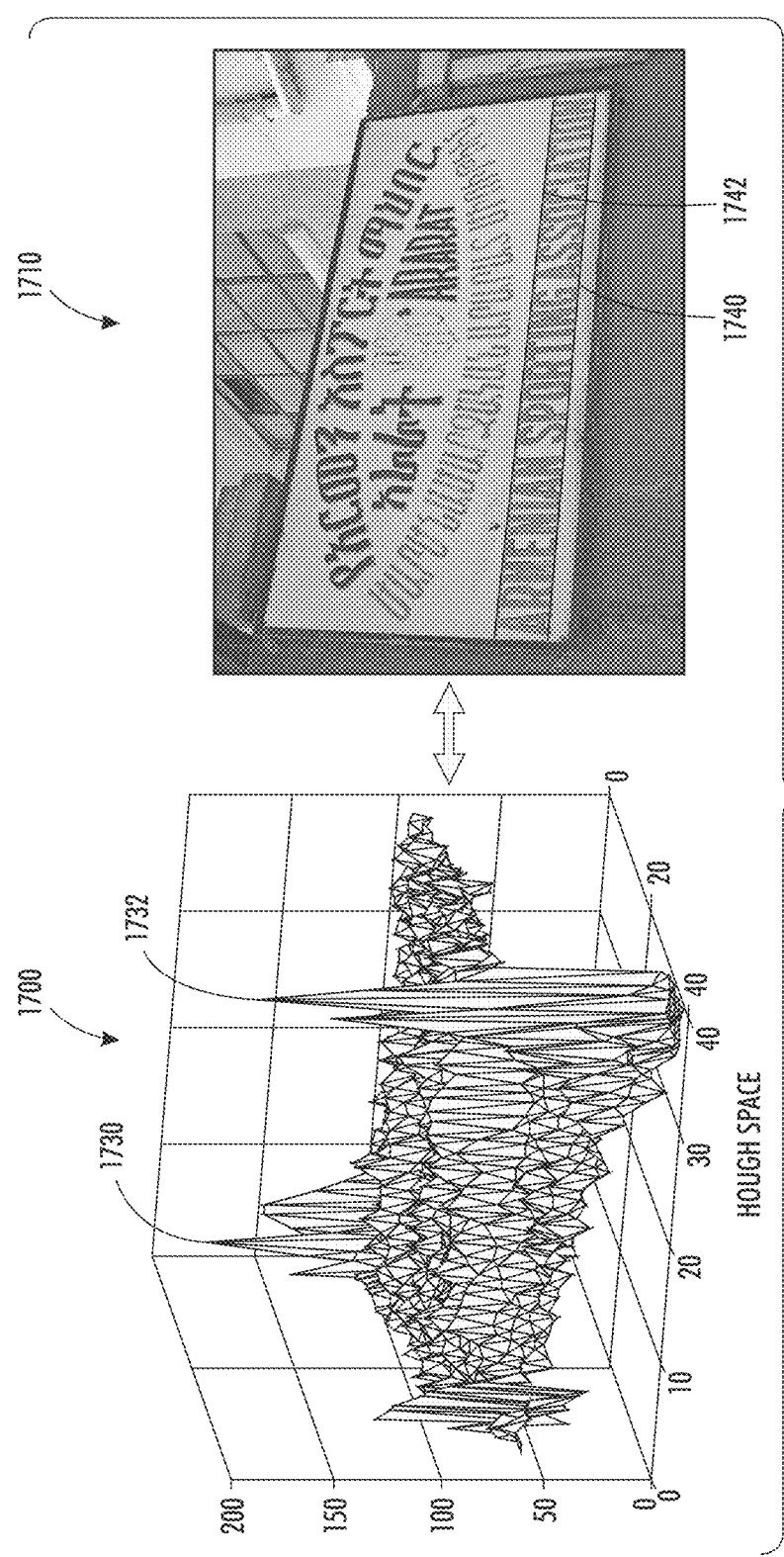
FIG. 17 illustrates conversion of points in a Hough space to lines in an image.

FIG. 17 illustrates a histogram plot 1700 of the sign from an image 1710. The histogram plot 1700 includes a first peak 1730 and a second peak 1732 which correlate to a waistline 1742 and a baseline 1740 of a text string from the image 1710. In this manner lines from an image can be translated into Hough space to ascertain the location of peaks and vice versa. The transformation from Hough space back to the original image can provide convergent lines utilized to ascertain one or more vanishing points of an image.

Figure 18:
FIG. 18 illustrates identification of vertical lines in an image.
Figure 19:
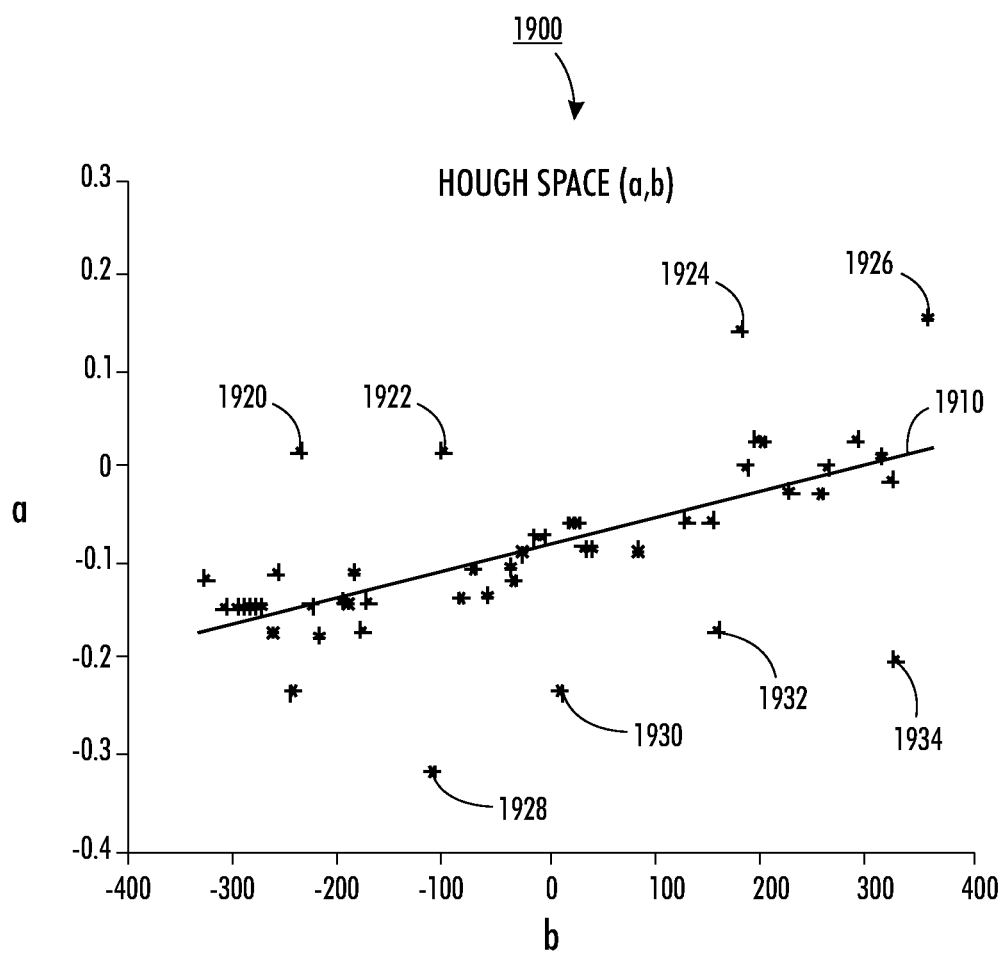
FIG. 19 illustrates conversion of vertical lines to points within a Hough space.

FIG. 18 illustrates an image 1800 that has a plurality of vertical strokes and lines 1802 through 1820. Here a Hough transform is applied in a vertical direction wherein a series of character based local Hough transforms, are utilized. FIG. 19 illustrates a graph 1900 that is representative of points from the vertical strokes and lines 1802-1820. In an ideal case, all the points are located on a line 1910. However, this is rarely the case in practice since disturbing strokes exist within the English alphabet such as letters "A", "N" and "W". Further, limited accuracy can be achieved based on a number of deleterious effects such as image quality, contrast, color, etc.

As noted, if all the vertical strokes are plotted as peaks in a Hough space, the duality of the two spaces indicates that a line should be expected. Accordingly, a least squares fitting can be performed in the Hough space to compute a vanishing point. This fitting is shown in the plot 1900 wherein an outlier rejection is applied for non-compliant strokes. In this embodiment, outliers are designated as points 1920, 1922, 1924, 1926, 1928, 1930, 1932 and 1934. In this embodiment, the outlier points 1920-1934 have a vertical distance from the line 1910 that is greater than a predetermined threshold. A horizontal vanishing point is computed in a similar way if redundant data also exists.

Figure 20:
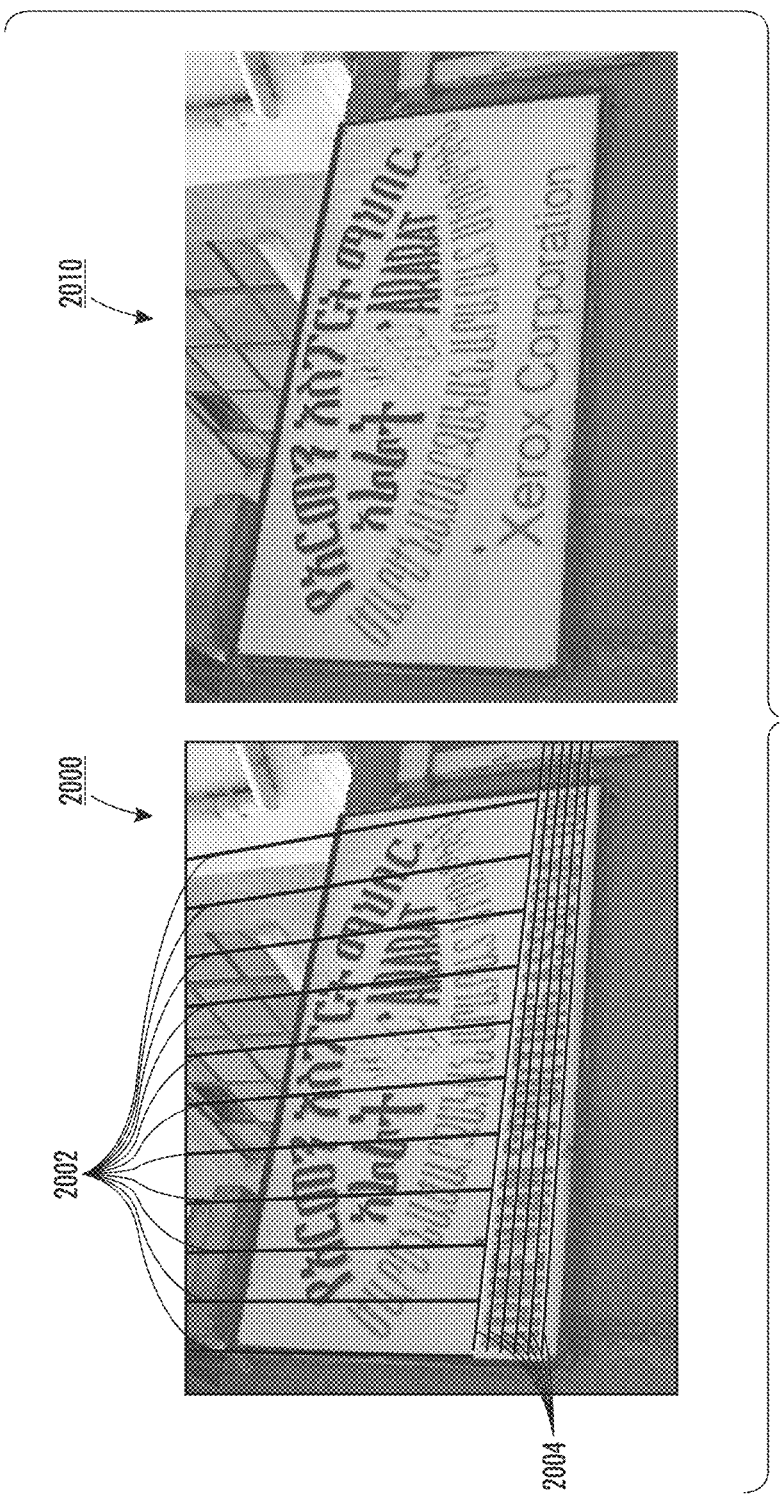
FIG. 20 illustrates facilitating placement of variable text within an image.

FIG. 20 illustrates two images, an image 2000 and an image 2010 that show the final step in the process of rendering variable text into a given image. Image 2000 shows an area that includes vertical lines 2002 and horizontal lines 2004. The vertical lines 2002 represent a first vanishing point and the horizontal lines 2004 represent a second vanishing point. The line sets provide the context and information required to estimate the 3-dimensional planar geometry for the variable text to be rendered within the image as provided in the image 2010. Although a user-interactive and automatic approach have been discussed separately above, it is contemplated to combine these approaches. In one example, a user can supply particular high-level cues, to be used in conjunction with low-level parameters calculated by an automatic image analysis step to determine a final surface geometry.

It is to be appreciated that text replacement as described herein can require a plurality of other steps. A first is erasure of the original text wherein a simple distance weighted interpolation technique can be employed to replace text pixels with a local estimate of the background. In addition, properties of the new variable text can be determined beyond a geometry property to include a color, a size, a font, a shading, a blur, etc. In this manner, the new text rendering is enabled to be consistent with the previously existing text and/or the rest of the scene. In one embodiment, color is estimated from an average of classified text pixels while the size of the new text is determined by a selected region of original text from an image. In a further embodiment, automatic estimation can be performed via a artificial intelligence component (not included) for rendering of variable text as described herein.

For texture modulation, one approach is to use a large collection of real world images to derive sets of resolution-independent basis functions to describe real world textures under a range of illumination conditions and viewpoints. In the second step, texture regions in any arbitrary image can be identified and fit to some combination of these basic functions. The results of such a fit might be used for inference of the illumination conditions or viewpoint. In the rendering step, the basis weights can be modulated in real time, thus imposing a modulation on the texture in a natural way to create a readable text message on the image.

In addition to modulating the basis weights, texture information can be utilized to infer 3-D geometric information such as perspective and foreshortening within the image. Any application, applet or engine (such as JAVA) can be utilized for the creation, modulation and insertion of variable text into an image.

In one approach the first step is skipped to incorporate the personalized text by modulating a chosen image property (e.g. contrast or luminance) at some fixed predetermined location in the image (e.g. top center) independent of image content. The advantage is that the image analysis required in step one is eliminated. Another variant is pattern modulation, wherein a region of an image is identified that contains repeating patterns. Examples include brick or tiles walls, or walkways, windows in office buildings, chain link fences, etc. A message is then imposed into this pattern by modifying the pattern. Examples might include eliminating or adding mortar joints in a brick wall or changing color and/or likeness.

The exemplary embodiments have been described with reference to the preferred embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. A computer-implemented method for placing a personalized text into an image to generate a natural text-rendered image comprising:
    determining a location and region within the image where the personalized text is to be placed;
    estimating a 3D geometry of a planar surface proximate to the location and region where the personalized text is to be placed;
    receiving a personalized text string;
    incorporating the personalized text string into the image to appear as if it is rendered onto the planar surface according to the estimated 3D geometry; and
    outputting the natural text-rendered image;
    wherein estimating the 3D geometry comprises:
        determining a first convergent line set and a second convergent line set, wherein the lines within each set are deemed to be parallel in the image;
        identifying a first vanishing point and a second vanishing point based at least in part upon the first and second convergent line sets;
        determining a field of view of the image; and
        determining a normal vector of the planar surface;
    wherein incorporating the personalized text string into the image comprises rendering the personalized text string into the determined location and region within the image using a text mask, wherein the text mask is used to modulate one or more of texture, luminance, chrominance, and transparency of the image; and
    wherein texture modulation comprises:
        utilizing a priori a plurality of images to derive sets of resolution independent basis functions that describe real world textures under a range of illumination conditions and viewpoints;
        fitting a texture within the determined location and region of a selected image to a linear combination of the basis functions to generate basis weights; and
        modulating the basis weights in real time to impose a modulation on the texture in a natural way that creates readable text within the image.

2. The method according to claim 1, wherein the determining step comprises:
    receiving an initial location from a user via a graphical interface; and
    automatically growing a region about this initial location based on a homogeneity property calculated proximate to the initial location.

3. The method according to claim 1 wherein the determining step comprises analyzing the image and automatically identifying one or more regions suitable for text placement using a homogeneity property calculated on the image pixels.

4. The method according to claim 1, wherein receiving the personalized text string comprises accessing a database containing a plurality of records of personalized information and retrieving an appropriate record.

5. A computer implemented method for replacing an existing text string within an image with a personalized text string to generate a natural text-rendered image, comprising:
- identifying a location and region within the image containing the existing text string to be replaced;
- deriving selected features from the existing text string;
- determining a 3D geometry of a surface upon which the existing text string has been rendered based on one or more of the selected features;
- determining a normal vector of the surface;
- erasing the existing text string;
- receiving the personalized text string;
- incorporating the personalized text string into the image to appear as if it is rendered onto the surface in place of the previously existing text string according to the estimated 3D geometry; and
- outputting the natural text-rendered image;
- wherein deriving the selected features comprises:
  - segmenting the existing text string from a background of the image; and
  - deriving the existing text string edges;
  - wherein a binary search algorithm is employed to establish a predetermined threshold based upon one that produces the largest number of connected components of the existing text string edges.

6. The method of claim 5 wherein the surface upon which the existing text string is rendered is assumed to be planar.

7. The method of claim 5 wherein identifying the location and region involves receiving user-entered vertices of a bounding polygon via a graphical user interface.

8. The method of claim 5 wherein identifying the location and region is performed automatically via analysis of the image.

9. The method of claim 5, wherein determining the 3D geometry comprises:
- identifying a horizontal convergent line set based at least in part on one or more text string edges;
- identifying a vertical convergent line set based at least in part on one or more text string edges;
- computing a first vanishing point and a second vanishing point based at least in part upon the horizontal and the vertical convergent line sets; and
- determining a field of view of the image.

10. The method of claim 9, wherein the convergent lines and vanishing points are calculated via Hough transforms.

11. The method of claim 5, wherein erasing the existing text string comprises replacing each text pixel with an estimated background color.

12. The method of claim 5 wherein incorporating the personalized text string into the image further comprises calculating selected properties of the personalized text string to be similar to those of the previously existing text string.

* * * * *